March 1, 1960
A. R. JOY
2,926,555
HOLE CUTTING SAW
Filed Aug. 26, 1958
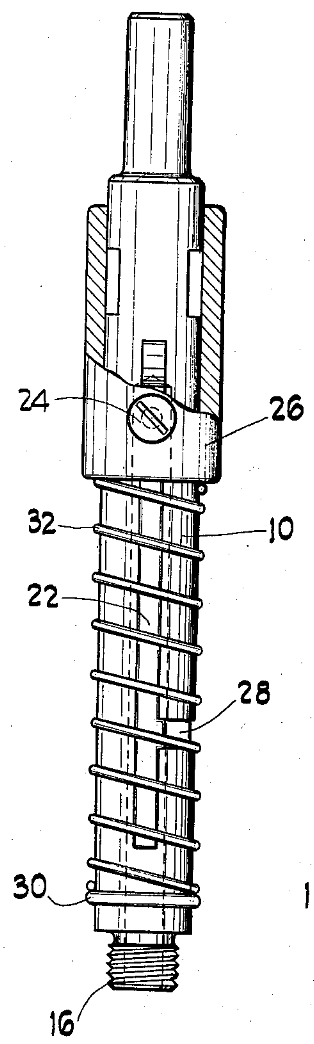
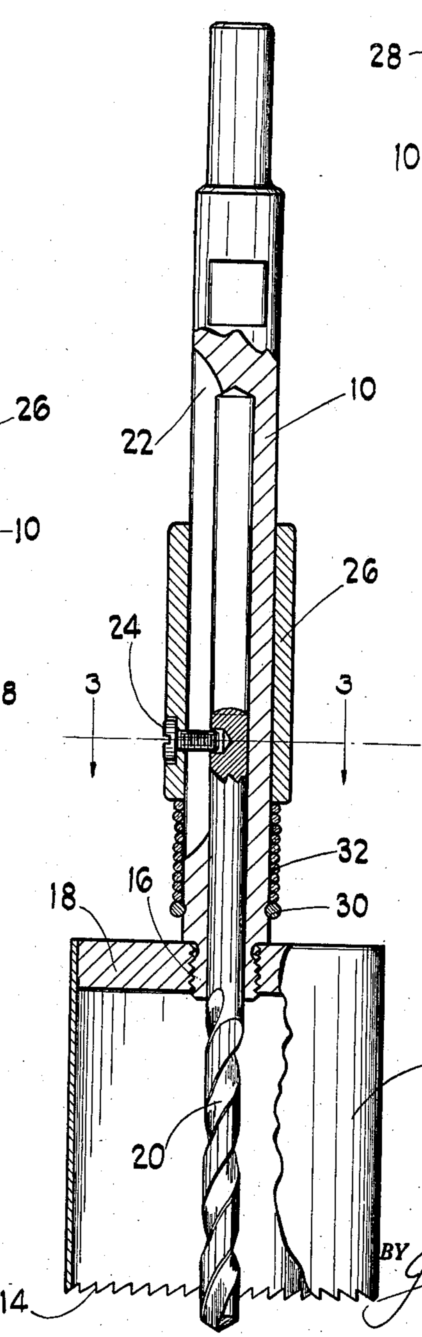
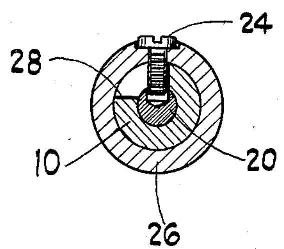
INVENTOR.
A. R. JOY
BY Joseph J. Schofield
ATTORNEY 2,926,555
Patented Mar. 1, 1960

2,926,555

HOLE CUTTING SAW

Alfred R. Joy, West Hartford, Conn., assignor to R. M. Starbuck & Sons, Hartford, Conn., a corporation of Connecticut Application August 26, 1958, Serial No. 757,315

1 Claim. (Cl. 77—69)

This invention relates to a trepanning tool for cutting circular openings through walls, floors, etc. through which pipes may be passed for water or steam connections, etc.

An object of the present invention is to provide a tool of the annular cylindrical type having cutting teeth extending around one end, there being a centrally mounted drill which may be extended to a position so that its cutting end is beyond the plane of the circular series of cutting teeth on the annular tool and also may be retracted to a position within the tool.

Another object of the invention is to provide a solid connection between the driving end of the tool and the annular cutter, the central drill being driven by the shaft and movable to its retracted or extended position with a sleeve to which it is attached surrounding the central portion of the driving shaft for the annular cutter.

And finally it is an object of the invention to provide spring means normally retaining the central drill in its retracted position and having a lateral detent or recess to retain the drill in its forward position with the spring in its compressed condition.

With the above and other objects in view, the invention may include the features of construction and operation set forth in the following specification and illustrated in the accompanying drawing.

In the accompanying drawing annexed hereto and forming a part of this specification, I have shown the invention embodied in one form of a medium sized steam fitter's or plumber's tool but it will be understood that the invention may be otherwise embodied and that the drawing is not to be construed as defining or limiting the scope of the invention, the claim appended to this specification being relied upon for that purpose.

In the drawing:

Fig. 1 is a longitudinal view of the principal parts of the hole cutting tool, parts being sectioned to more clearly show their construction;

Fig. 2 is an outside longitudinal view showing the driving shaft, and sleeve surrounding the shaft, for attachment to the central drill; and Fig. 3 is a cross sectional view taken on the plane of line 3—3 in Fig. 1.

In the above mentioned drawing, there has been shown but one embodiment of the invention which is now deemed preferable, but it is to be understood that changes and modifications may be made within the scope of the appended claim without departing from the spirit of the invention.

Briefly, and in its preferred aspect, the invention may include the following principal parts: First, a central shaft recessed centrally for a portion of its length and threaded at one end; second, a cylindrical member having cutting teeth about its periphery at one end and attached to the threaded end of said shaft; third, a drill rotatable with the shaft and cylindrical mmeber and slidably mounted within the recess in the shaft; fourth, a sleeve surrounding the central portion of the shaft and attached to the central drill by means extending through a longitudinal slot formed in the shaft; fifth, a helical spring surrounding the shaft and normally retaining the sleeve and drill in their retracted position; and sixth, detent means to retain the drill in its forward position with the spring in its contracted condition.

Referring more in detail to the figures of the drawing, it will be seen that the trepanning tool comprises a main shaft 10 to one end of which may be rigidly attached an annular cutter 12 having cutting teeth 14 around its free end.

To attach the annular cutter or saw 12 to the driving shaft 10, the end of the shaft may be externally threaded as shown at 16. The cutter 12 at its upper end is provided with a head plate 18 threaded directly to the shaft 10 by the threads 16. The periphery of the head plate 18 may be riveted or otherwise permanently secured to the annular cutting tool 12 at its end opposite the cutting teeth 14.

At the upper end of the shaft 10 a carpenter's brace or other manual or power operated driving means may be attached by means of which the tool may be rotated.

As shown in the drawing, the shaft 10 is hollow for a portion of its length to accommodate a centrally disposed drill 20 slidable therein. A slot 22 extends along one side of the shaft 10 through which a screw or other fastener 24 extends. The threaded inner end of this screw 24 is threaded into or extends freely within the upper end of the drill 20. Rotation of the shaft 10 and sleeve 26 surrounding the shaft therefore also will rotate the drill 20. To retain the drill 20 in its extended or cutting position, a short lateral recess 28 is provided which extends from one side edge of the axially extending slot 22. Into this recess the screw 24 by slight rotation of the drill 20 relative to the shaft 10 may extend and retain the drill 20 in its advanced position for its cutting operation.

Between the forward end of the sleeve 26 surrounding the shaft and an abutment or shoulder 30 on the shaft 10 is a helical spring 32 surrounding the shaft 10. Preferably and as shown in the drawing, this abutment or shoulder 30 for the forward end of the spring 32 is in the form of a ring snapped in place around the shaft 10 and fitting partially within an annular recess formed in the shaft.

In operation and with the parts of the tool in the position shown in Fig. 1 of the drawing, a small hole is started by the drill 20. After the drill has cut sufficiently into the wall or floor, the drill 20, still in its extended or cutting position, serves as a guide or pilot for the annular cutter 12 to start its cutting action. After the annular cutter 12 has cut into the wall or floor a short distance and no longer requires piloting, the sleeve 26 may be rotated slightly relative to the shaft 10 to disengage the screw or fastener 24 from the lateral recess in the slot 22 and permit the drill 20 to be retracted by its spring 32. The annular cutter 12 may then continue its cutting operation without any further cutting or piloting by the central drill.

After completion of the cutting of the hole by cutter 12 the tool may be removed with the part cut by cutter 12 retained within the walls of the cutter 12. The sleeve 26 may then be manually forced forward so that the end of drill 20 will engage against and force the part removed by the cutter 12 from within the cylindrical space inside the cutter.

I claim:

A trepanning tool comprising a driving shaft, a hollow cylindrical member attached to said shaft at one end thereof, said member having cutting teeth extending around the free end thereof, a central drill slidably mounted for movement axially within a recessed portion of said shaft, a sleeve surrounding a longitudinally slotted portion of said shaft, means passing through said slotted portion and connecting said sleeve to said drill whereby said drill may be rotated with said shaft, means to retain said drill in fixed forward cutting position, and resilient means to retain said drill in retracted position.

References Cited in the file of this patent

UNITED STATES PATENTS

| | | |
|---|---|---|
| 2,414,133 | Barr | Jan. 14, 1947 |
| 2,754,864 | Elsy | July 17, 1956 |